May 12, 1964     N. F. CERULLI     3,133,222

ELECTROLUMINESCENT DEVICE AND METHOD

Filed April 19, 1961

INVENTOR.
NICHOLAS F. CERULLI.
BY
*W. D. Palmer*
ATTORNEY

United States Patent Office 3,133,222
Patented May 12, 1964

3,133,222
ELECTROLUMINESCENT DEVICE AND METHOD
Nicholas F. Cerulli, North Caldwell, N.J., assignor to Westinghouse Electric Corporation, East Pittsburgh, Pa., a corporation of Pennsylvania
Filed Apr. 19, 1961, Ser. No. 104,149
6 Claims. (Cl. 313—108)

This invention relates to electroluminescent devices and, more particularly, to a method for making a ceramic-type electroluminescent device having improved performance characteristics and the electroluminescent device which has been prepared by such a method.

The phenomenon of electroluminescence was first disclosed by G. Destriau, one of his earlier publications appearing in London, Edinburgh and Dublin Philosophical Magazine, series 7, volume 38, No. 285, pages 700–737 (October 1947). Since this early publication, electroluminescent devices have been marketed commercially. In one construction for electroluminescent devices, the phosphor is embedded in plastic dielectric material. In another construction for such devices, the phosphor is embedded in a ceramic material in the form of a layer and the energizing electric field is applied across this phosphor-ceramic layer in order to produce light. This latter type of such devices can be categorized as ceramic-type electroluminescent devices. The maintenance of initial light output for such ceramic-type devices is normally very good, but the initial brightness tends to be relatively low. In addition, the efficiency of conversion of electrical energy to light is not as good as desired.

It is the general object of this invention to provide a method for making a ceramic-type electroluminescent device which has improved performance characteristics.

It is another object to provide a method for fabricating a ceramic-type electroluminescent device which has improved brightness and efficiency.

It is a further object to provide a ceramic-type electroluminescent device having improved performance characteristics and which device has been fabricated by an improved method.

The aforesaid objects of the invention, and other objects which will become apparent as the description proceeds, are achieved by providing an improved method for fabricating a ceramic-type electroluminescent device. In practicing this method, finely divided zinc sulfide type phosphor and ceramic frit are mixed together in predetermined portions. With this mix is included from 0.01% to 1% by weight of finely divided metallic salt, the cation of which is readily oxidized to a higher valent state. The resulting mixed phosphor, frit and metallic salt are placed proximate to a metallic substrate for an electroluminescent device and the mix is heated in order to form a continuous phosphor-ceramic layer which is adherent to the substrate. Thereafter the operative portion of the electroluminescent device is completed by placing an additional electrode over the formed, continuous, phosphor-ceramic layer. During the heating step, the metallic salt protects from oxidization cuprous sulfide segregations which are present within the phosphor and which are required for good electroluminescent performance characteristics. As a result, the device has very good brightness and efficiency. There is also provided the improved device which has been prepared by such a method.

For a better understanding of the invention, reference should be had to the accompanying drawings wherein.

Figure 1:
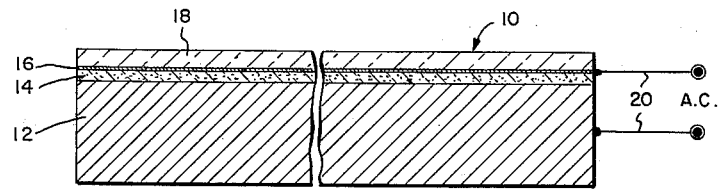
FIG. 1 is an elevational view, partly in section, showing a ceramic-type electroluminescent device which has been fabricated in accordance with the present method.

With specific reference to the form of the invention illustrated in the drawings, the numeral 10 in FIG. 1 indicates generally an electroluminescent device which comprises a metallic substrate or foundation 12 carrying thereover a continuous layer 14 comprising a mixture of finely divided phosphor embedded in a ceramic material. A light-transmitting electrode layer 16 is carried over the phosphor-ceramic layer 14 and a light-transmitting and electrically insulating cover coat 18 is provided over the electrode layer 16, in order to prevent shock hazard. Conventional electrical lead-in conductors 20 connect to the foundation 12 and the light-transmitting electrode layer 16.

Figure 2:
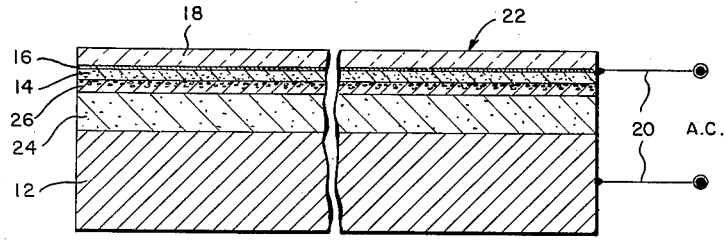
FIG. 2 is an elevational view, partly in section, of an alternative construction for a ceramic-type electroluminescent device which has been fabricated in accordance with the present invention.

The embodiment 22, as shown in FIG. 2, is generally similar to the device embodiment 10, as shown in FIG. 1, except that an additional base or ground coat layer 24 of ceramic is provided adjacent the foundation 12 in order to improve the electrical puncture strength of the device. A further additional layer 26 comprising barium titanate is placed over the ceramic ground coat 24, in order to prevent any contamination of the phosphor layer 14 by iron which may migrate from the substrate 12. Such an alternative embodiment is described in detail in copending application S.N. 78,156, filed December 23, 1960 and owned by the present assignee. In the embodiment 22, the phosphor-ceramic layer 14 is adhered to the metallic substrate 12 through an intermediate ceramic ground coat. It should be understood that other intermediate ceramic layers can be utilized, in order to improve the adherence of the phosphor-ceramic layer 24 to the metallic foundation 12.

As a specific example, the foundation or substrate 12 is formed of conventional enameling iron having a thickness of approximately $\frac{1}{16}$ inch. This substrate 12 serves the dual function of support for the electroluminescent device and also constitutes one operating electrode. The phosphor portion of the layer 14 has a matrix comprising zinc sulfide and incorporates copper as activator. The phosphor is in finely divided form and, as an example, the average phosphor particle diameter is approximately 10 microns. This average particle diameter is subject to considerable variation.

The usual electroluminescent phosphors include zinc sulfide as a portion of the phosphor matrix constituent. Other group IIB metals can be substituted for a portion of the zinc and selenium can be substituted for a portion of the sulphur. Such phosphor modifications are now well known. The primary phosphor activator is copper and this copper activator can be supplemented by other activator materials such as manganese or lead. In preparing such electroluminescent phosphors, there is initially included within the raw mix an excess of copper compound over that which is normally required to activate an ultraviolet-responsive or so-called photoluminescent material. Some of this excess copper is incorporated in the phosphor matrix in the form of cuprous sulfide segregations which apparently play a large factor in establishing the intense electric fields which are required for electroluminescence. After the phosphor raw mix has been fired, the resulting material will have a dark appearance because of the excess copper which is present. Thereafter, a considerable portion of the copper is removed by washing the dark, fired phosphor in a solution which is a good solvent for cuprous sulfide but which is not a good solvent for zinc sulfide. An example of such a wash is a one-normal solution of sodium cyanide, desirably made alkaline by the addition of a small amount of sodium hydroxide in order to prevent the formation of HCN. After this washing, the phosphor will have a generally whitish body color. For further details for preparing a suitable electroluminescent phosphor, reference is made to U.S. Patent No. 2,874,128, granted February 17, 1959 to Wachtel.

Phosphors prepared in accordance with the foregoing patent, for example, or in accordance with other now-conventional methods, normally lose some of their electroluminescent performance characteristics, that is, brightness and efficiency, when incorporated into a ceramic-type electroluminescent device. It has been determined that the ceramic frit, with which the phosphor is mixed in forming a continuous phosphor-ceramic layer, tends to react with the cuprous sulfide segregations which are included with the phosphor matrix. Apparently these cuprous sulfide segregations are oxidized so that the copper is converted from cuprous sulfide to cupric sulfide or cupric oxide. This impairs the electroluminescent performance characteristics of the phosphor.

Figure 3:
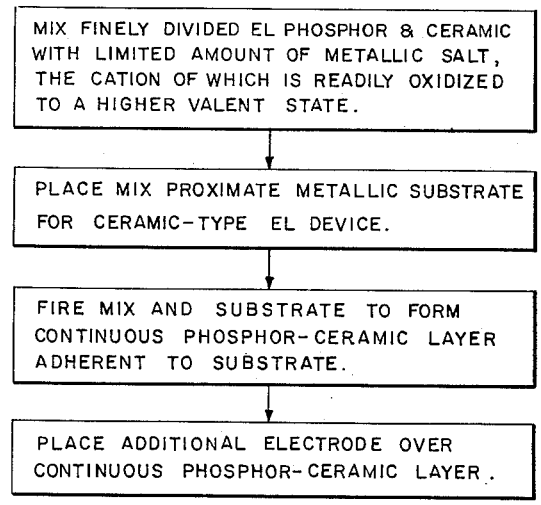
FIG. 3 is a flow chart setting forth the steps of the present method.

In accordance with the present invention, and as generally shown in the flow diagram of FIG. 3, the electroluminescent phosphor and ceramic frit have included therein from 0.01% to 1% by weight of a finely divided metallic salt, the cation of which is readily oxidized to a higher valent state, and which metallic salt is free from any element of the group consisting of iron, cobalt, nickel and chromium. These latter-indicated elements are well known as "poisoners" for phosphor output. The preferred metallic salt which is used is manganese, added in the form of manganous nitrate. As an example, any suitable glass frit can be first prepared in accordance with conventional practices, such as by melting the glass constituents and pouring the melted glass onto a cold metallic plate in order to shatter the glass. Thereafter the resulting glass is screened through a No. 325 mesh, for example, and the finely divided phosphor mixed with the glass which passes the mesh. Specific examples of a suitable glass frit are given in copending applications S.N. 816,404, filed May 28, 1959 and S.N. 816,405, filed May 28, 1959, both owned by the present assignee. As a first example, the finely divided glass frit can comprise 23.5 parts ZnO, 29.5 parts BaO, 35.3 parts $B_2O_3$, 7.8 parts $K_2O$ and 3.9 parts $Na_2O$. As a second example, a suitable glass frit can comprise 1.3 parts $Li_2O$, $Na_2O$, 10.3 parts $K_2O$, 6.2 parts BaO, 30.8 parts ZnO, 2.6 parts $Al_2O_3$, 3.6 parts $TiO_2$, 27.5 parts $B_2O_3$, 12.5 parts $SiO_2$ and 0.4 part F, all proportions in the foregoing examples being indicated as parts by weight of the oxides.

In mixing the metallic salt with the phosphor and frit in accordance with the present invention, it is preferred to use a wet mixing technique, in order to insure that the added metallic salt is very evenly distributed throughout the phosphor and mixed frit. Preferably about 0.05% by weight of the metallic salt is utilized. Alternatively, the metallic salt can be mixed directly with the phosphor per se or with the finely divided frit per se. In either case, the metallic salt will be evenly distributed throughout the phosphor-frit mixture. The relative parts by weight of phosphor and frit can vary considerably and, as an example, seven parts by weight of frit are used per four parts by weight of phosphor.

The mixed phosphor and frit are then applied to the enameling iron substrate 12 as a slurry or a powder layer and the enameling iron substrate fired at a predetermined temperature for a predetermined time in order to form a continuous phosphor-ceramic layer which adheres to the substrate or to an intermediate ceramic layer, if one is used. In the case of the foregoing specific glass, it has been found that a firing temperature of approximately 580° C. to 620° C. for a period of five minutes is sufficient to form phosphor-ceramic layer 14 having a thickness of approximately two mils. This thickness is subject to considerable variation. The temperature which is used to fuse the frit to form the continuous layer 14 should be less than 750° C. in order to avoid damaging the phosphor.

During the foregoing firing, the added metallic salt serves as a reducing medium and prevents the cuprous sulfide segregations from oxidizing. While at least a portion of the cation of the metallic salt is oxidized to a higher valent state, the cuprous sulfide segregations are not appreciably oxidized.

The electrode 16, which is formed of tin oxide for example, is then formed on the ceramic-phosphor layer 14 in accordance with conventional practices. Other light-transmitting electrode materials such as indium oxide or a light-transmitting wire mesh can be substituted therefor, if desired. This completes the operative portion of the device. It is desirable to include a light-transmitting cover coat 18 over the electrode 16 in order to prevent shock hazard. Such a cover coat can be formed of epoxy resin or of a suitable glass and such glasses are well known.

In testing electroluminescent devices fabricated in accordance with the present method, electroluminescent devices were prepared to be generally identical, except that the manganous nitrate addition was not used in the preparation of the control devices. Devices which were prepared with the manganous nitrate addition, in accordance with the present invention, displayed a brightness and efficiency almost twice as great as the control devices.

Other manganous salts can be utilized in place of the nitrate and other metals as salts, the cation of which is readily oxidized to a higher valent state, can be substituted for manganese. As an example, tin as stannous fluoride, antimony as trioxide or arsenic as trioxide can be used to replace manganese nitrate in the foregoing specific example.

It will be recognized that the objects of the invention have been achieved by providing a method for making a ceramic-type electroluminescent device which has improved performance characteristics, including brightness and efficiency. In addition, there has been provided an improved ceramic-type electroluminescent device which has been fabricated by an improved method.

While best embodiments of the present invention have been illustrated and described in detail, it is to be particularly understood that the invention is not limited thereto or thereby.

I claim:

1. The method of fabricating, without undue loss of brightness, the operative portion of a ceramic-type electroluminescent device which utilizes phosphor having a matrix comprising zinc sulfide and including copper as activator, which method comprises: mixing in predetermined proportions and in finely divided status said phosphor and a ceramic frit which will fuse to form a continuous light-transmitting layer at a temperature of less than 750° C.; including as an additive to said phosphor-frit mixture and throughout said phosphor-frit mixture from 0.01% to 1% by weight of said mixture of finely divided metallic salt, the cation of which is readily oxidized to a higher valence state, and which metallic salt is free from any element of the group consisting of iron, cobalt, nickel and chromium; placing said finely divided mixture proximate to a metallic substrate; heating said substrate and said finely divided mixture at a predetermined temperature for a predetermined time to form a continuous phosphor-ceramic layer adherent to said substrate; and thereafter placing an additional light-transmitting electrode over said formed continuous phosphor-ceramic layer to complete the operative portion of said device.

2. The method as specified in claim 1, wherein said metallic salt is included throughout said phosphor-frit mixture in amount of about 0.05% by weight of said phosphor-frit mixture.

3. The method as specified in claim 1, wherein said metallic salt is manganous nitrate.

4. The method as specified in claim 1, wherein said metallic salt is initially mixed with said phosphor.

5. The method as specified in claim 1, wherein said metallic salt is initially mixed with said ceramic frit.

6. A ceramic-type electroluminescent device, the operative portion of which includes a metallic substrate, a continuous layer thereover comprising phosphor having a matrix comprising zinc sulfide and including copper as activator embedded in light-transmitting ceramic material, and a light-transmitting electrode layer over said phosphor-ceramic layer, the operative portion of said device having been prepared by the method which comprises: mixing in predetermined proportions and in finely divided status said phosphor and a ceramic frit which will fuse to form a continuous light-transmitting layer at a temperature of less than 750° C.; including as an additive to said phosphor-frit mixture and throughout said phosphor-frit mixture from 0.01% to 1% by weight of said mixture of finely divided metallic salt, the cation of which is readily oxidized to a higher valence state, and which metallic salt is free from any element of the group consisting of iron, cobalt, nickel and chromium; placing said finely divided mixture proximate to a metallic substrate; heating said substrate and said finely divided mixture at a predetermined temperature for a predetermined time to form a continuous phosphor-ceramic layer adherent to said substrate; and thereafter placing an additional light-transmitting electrode over said formed continuous phosphor-ceramic layer to complete the operative portion of said device.

References Cited in the file of this patent

UNITED STATES PATENTS 2,965,784     Hoffman  ---------------  Dec. 20, 1960